United States Patent
Roh et al.

(10) Patent No.: US 7,366,904 B2
(45) Date of Patent: Apr. 29, 2008

(54) METHOD FOR MODIFYING VALIDITY OF A CERTIFICATE USING BIOMETRIC INFORMATION IN PUBLIC KEY INFRASTRUCTURE-BASED AUTHENTICATION SYSTEM

(75) Inventors: Jong-Hyuk Roh, Incheon (KR); Taesung Kim, Daejeon (KR); Hee Sun Kim, Daejeon (KR); Dae Seon Choi, Daejeon (KR); Young Seob Cho, Daejeon (KR); Sang Rae Cho, Daejeon (KR); Seung Hun Jin, Daejeon (KR)

(73) Assignee: Electronics and Telecomunications Research Institute, Daejeon (KR)

( * ) Notice: Subject to any disclaimer, the term of this patent is extended or adjusted under 35 U.S.C. 154(b) by 818 days.

(21) Appl. No.: 10/082,334

(22) Filed: Feb. 26, 2002

(65) Prior Publication Data

US 2003/0076962 A1    Apr. 24, 2003

(30) Foreign Application Priority Data

Oct. 18, 2001    (KR) .............................. 2001-64186

(51) Int. Cl.
*H04L 9/16* (2006.01)
*H04L 9/20* (2006.01)
*H04L 9/32* (2006.01)

(52) U.S. Cl. ...................... 713/175; 713/186; 713/176

(58) Field of Classification Search ........ 713/175–176, 713/186
See application file for complete search history.

(56) References Cited

U.S. PATENT DOCUMENTS

| 6,105,010 | A  | * | 8/2000  | Musgrave ..................... 705/44 |
| 6,928,546 | B1 | * | 8/2005  | Nanavati et al. ............. 713/186 |
| 2002/0176583 | A1 | * | 11/2002 | Buttiker ....................... 380/282 |
| 2003/0018890 | A1 | * | 1/2003  | Hale et al. .................. 713/156 |
| 2003/0208684 | A1 | * | 11/2003 | Camacho et al. ........... 713/186 |

FOREIGN PATENT DOCUMENTS

KR    0147385    6/2001

OTHER PUBLICATIONS

Youm; Research & Development Trends and Domestic Standard on.; *Telecommunicatios Review*, vol. 10, No. 5, pp. 915-938, Oct. 2000.

* cited by examiner

*Primary Examiner*—Gilberto Barron, Jr.
*Assistant Examiner*—Venkat Perungavoor
(74) *Attorney, Agent, or Firm*—Lowe Hauptman Ham & Berner LLP

(57) ABSTRACT

The present invention provides a method for modifying validity of a certificate in a public key infrastructure (PKI)-based authentication system, which is capable of performing online suspension, recovery and revocation of a certificate between a user system and a certificate authority by executing user authentication with guaranteed reliability using user biometric information. Accordingly, there is no need for the user to personally visit a registration authority or certificate authority to modify the certificate validity. The user can easily modify the certificate validity using his/her user system connected online to the certificate authority.

14 Claims, 5 Drawing Sheets

METHOD FOR MODIFYING VALIDITY OF A CERTIFICATE USING BIOMETRIC INFORMATION IN PUBLIC KEY INFRASTRUCTURE-BASED AUTHENTICATION SYSTEM

FIELD OF THE INVENTION

The present invention relates to a public key infrastructure (PKI); and, more particularly, to a method for modifying validity of a certificate in a PKI-based authentication system, which is capable of performing suspension, recovery and revocation of a certificate due to private key compromise online between a user system and a certificate authority by executing user authentication using user biometric information.

BACKGROUND OF THE INVENTION

In general, a public key infrastructure (PKI) is a system that is capable of performing encryption transmissions/receptions of digital documents requiring Internet security using public and private keys between member users authenticated by an authentication system. In other words, the PKI is a system in which the users registered as members in the authentication system are issued with digital certificates from a corresponding certificate authority, which certify that the public key of a certificate is allowed to a certificate user. The PKI users can encrypt digital documents requiring the Internet security using each other's public key and transmit the digital documents by executing digital signatures using their private keys, thereby allowing the digital documents to be reliably transmitted/received between the member-registered users in the authentication system.

Currently, an RFC 2510 Internet X.509 Public Key Infrastructure Certificate Management Protocol (CMP) is proposed by IETF as a standard protocol in connection with a work/management for the certificate to perform a certificate register, certificate issue, proof of possession of a private key, certificate update, certificate recovery, certificate revocation and so forth in the PKI-based authentication system. The CMP employs an RFC 2511 certificate request message format (CRMF). The CMP prescribes that where there is a message from a user for requesting a certificate validity modification such as certificate suspension or certificate revocation, it is necessarily required to attach a digital signature to the certificate validity modification request message using a private key of the user in order to determine whether the modification request message has been forged.

However, in the conventional PKI-based authentication system, even though the user possesses his/her own private key, the user must personally visit an associated registration authority or certificate authority to recover the certificate. Further, in the conventional PKI-based authentication system, where user private key compromise occurs, so that the user cannot perform the digital signature, the user must personally visit the registration authority or certificate authority to verify his/her identity and personally request the certificate validity modification because it is impossible to process the suspension and revocation of the certificate online.

The above-described certificate validity modification method in the PKI-based authentication system may refer to, for example, Korean Application of Patent No. 1999-0051586, titled "Method for Generating Public Key Certificate for User in Certificate Authority System" and "Research & Development Trends and Domestic Standard on Public Key Infrastructure" described in Telecommunications Review, 10(5): 915-938(2000.10). The "Method for Generating Public Key Certificate for User in Certificate Authority System" discloses just a method for quickly generating a public key certificate for a user in an authentication authority. In the "Research & Development Trends and Domestic Standard on Public key infrastructure", there are disclosed just trends and standards for implementing public keys, and standards for domestic PKI. As a result, there still exists a problem in that the user must personally visit the corresponding the registration authority or certificate authority to modify the validity of the certificate in the conventional PKI-based authentication system.

SUMMARY OF THE INVENTION

It is, therefore, an object of the present invention to provide a method for modifying validity of a certificate, which is capable of performing online a certificate is suspension, recovery and revocation due to private key compromise between a user system and a certificate authority through user authentication using biometric information in a public key infrastructure-based authentication system.

In accordance with a preferred embodiment of the present invention, there is provided a method for modifying validity of a certificate using biometric information in a public key infrastructure-based authentication system including a registration authority for verifying identity of at least one user by proxy, a certificate authority for issuing the identity-verified user with the certificate and a user system, the method comprising the steps of: a) accessing a server of the certificate authority using login information of the user in response to a certificate validity modification request from the user under the condition that he/she is registered as a member in the authentication system; b) inputting the biometric information for a user authentication through a biometric information input unit in the user system; c) generating a certificate validity modification request message in response to the certificate validity modification request from the user; and d) sending the inputted biometric information and the generated certificate validity modification request message to the certificate authority to request the certificate validity modification online.

In accordance with another preferred embodiment of the present invention, there is provided a method for modifying validity of a certificate using biometric information in a public key infrastructure-based authentication system including a registration authority for verifying identity of at least one user by proxy, a certificate authority for issuing the identity-verified user with the certificate and a user system, the method comprising the steps of: a) receiving a message for requesting a certificate validity modification from the user system under the condition that the user system is connected to the authentication system via the Internet; b) receiving login information and the biometric information entered from the user for a system member authentication if he/she requests the certificate validity modification; c) determining whether the received biometric information is the same as user's biometric information registered in a database storage unit if the user is authenticated on the basis of the received login information; d) modifying the validity of the certificate issued to the user in response to the certificate validity modification request if the received biometric information is the same as the user's registered biometric information; and e) sending to the user system an acknowledgment message for notifying the user that the certificate validity modification has been normally processed.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
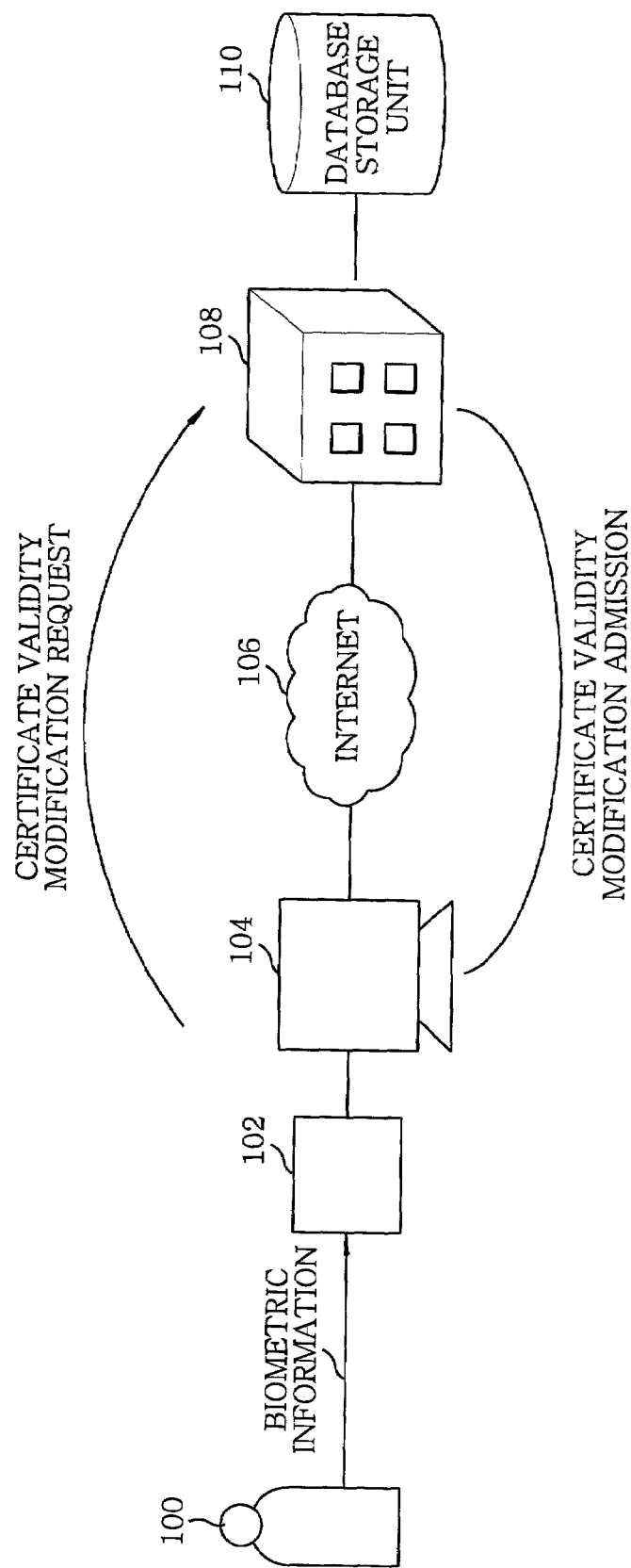
FIG. 1 is a network construction diagram of a public key infrastructure-based authentication system in accordance with the present invention.

With reference to FIG. 1, there is shown in block form a network construction of a public key infrastructure-based authentication system in accordance with a preferred embodiment of the present invention. As shown in this drawing, the PKI-based authentication system comprises a user system 104 and a certificate authority 108 for issuing a certificate to a user registered therein.

The user system 104 is a terminal device connectable to the Internet 106, such as a personal computer (PC). After being registered as a member in the certificate authority 108 and being issued with a certificate by the certificate authority 108, the user 100 can perform Internet activities requiring security, for example, Internet banking or secure Web mail and so forth by using the user system 104. If there is a need for a certificate validity modification owing to unavoidable circumstances, the user 100 can gain access to the certificate authority 108 through the user system 104 and perform online the certificate validity modification through user authentication using biometric information.

Especially, in an embodiment of the present invention, in order to solve the conventional problem in which the user 100 must in person visit a corresponding registration authority or certificate authority to modify validity of the certificate issued by the certificate authority, the user 100 can register his/her unique biometric information, such as a fingerprint, as well as user information to register himself or herself as a member in the certificate authority 108. This makes it possible to perform a highly reliable user authentication using the biometric information, thereby enabling the member user 100 of the authentication system to perform the certificate validity modification using the system 104 connected online to the certificate authority 108.

Figure 2:
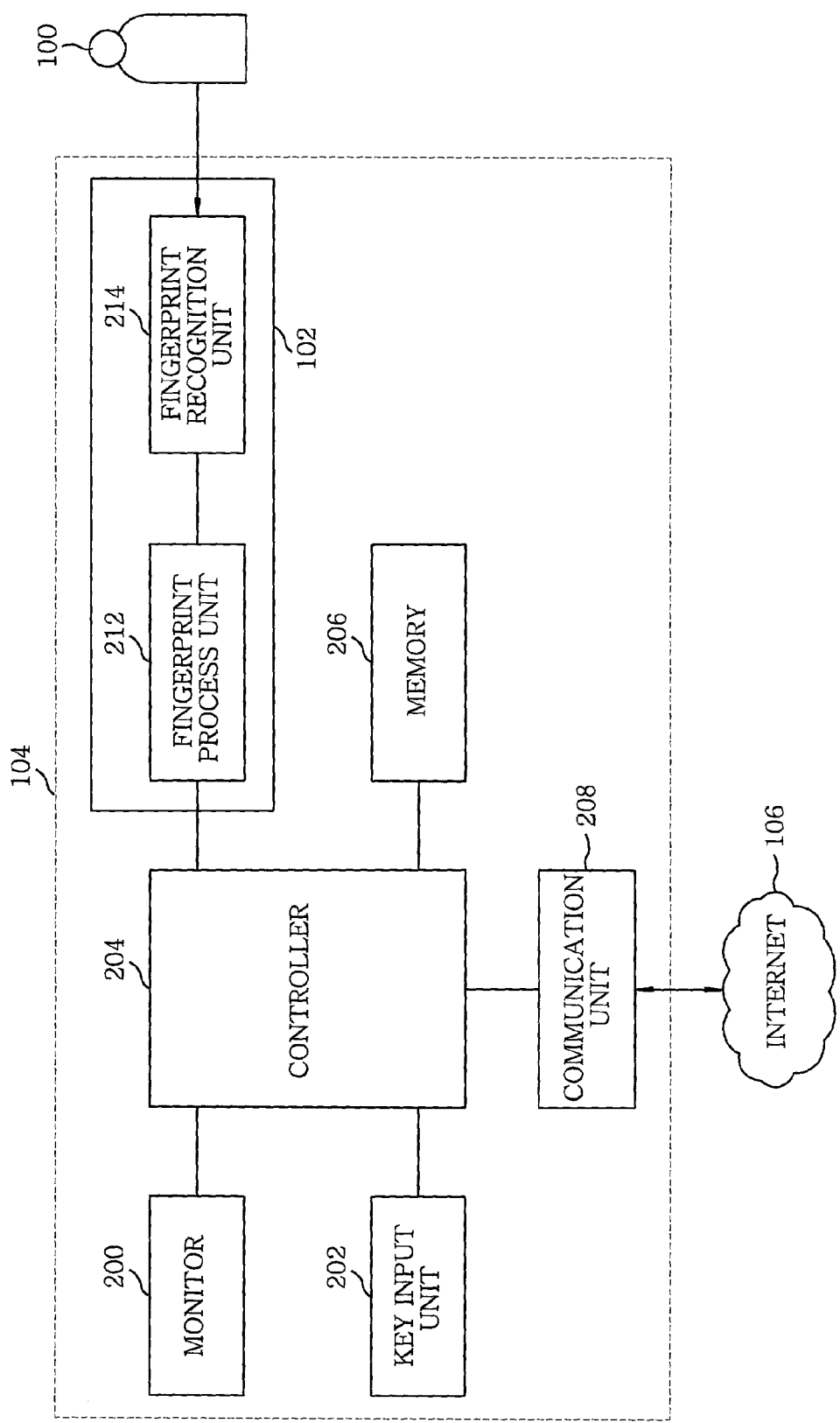
FIG. 2 is a schematic block diagram showing the construction of a user system in accordance with the present invention.

FIG. 2 is a schematic block diagram showing the construction of the user system 104 in FIG. 1. As shown in this drawing, the user system 104 includes a controller 204, a monitor 200, a memory 206, a communication unit 208, a key input unit 202 and a fingerprint information input unit 102. The controller 204 controls the entire operation of the user system 104. The controller 204 acts to download a Web page picture that is provided by the certificate authority 108 to the member user 100 of the authentication system when the user system 104 is connected to the authentication system according to the embodiment of the present invention, and to control the monitor 200 to display the downloaded Web page picture thereon. The controller 204 further acts to input the user biometric information entered from the user and send the inputted user biometric information to the certificate authority 108 together with a request message for a certificate validity modification if there is a request for the certificate validity modification, such as a certificate revocation, suspension, recovery and so forth, from the user 100 issued with the certificate by the certificate authority 108.

The memory 206 stores a variety of operation programs required for the operation of the controller 204. The memory 206 has a read only memory (ROM) for storing basic data needed for driving the operation programs and a random access memory (RAM) for temporarily storing programs run according to the control of the controller 204 and data which are generated while the operation programs are performed. The communication unit 208 sends the certificate validity modification request message to the certificate authority 108 under the control of the controller 204 and interfaces data transmitted and received over the Internet 106 between the certificate authority 108 and the user system 104. The key input unit 202 which is a user interface has various numeral and function keys and acts to generate key event data corresponding to a key input from the user and to transfer the generated key event data to the controller 204. The monitor 200 is provided in the user system 104 to display a variety of operating states thereon under the control of the controller 204.

The fingerprint input unit 102 is provided in the user system 104 according to the embodiment of the present invention as a biometric information input unit which is capable of inputting the biometric information of the user. The fingerprint input unit 102 has a fingerprint recognition unit 214 for scanning and inputting a fingerprint of the user through a fingerprint sensor and a fingerprint process unit 212 for analyzing the inputted unique user fingerprint information from the fingerprint recognition unit 214 to extract a unique fingerprint feature value of the user and transferring the extracted feature value to the controller 204 of the user system 104. It should be noted that the fingerprint input unit 102 is taken as an example of a biometric information input unit for the convenience of description in this embodiment of the present invention and the unique user biometric information is not limited to the fingerprint information. In the present invention, various biometric information including, for example, iris information, a face feature vector and so forth can be used as the unique user biometric information.

The certificate authority 108, as an essential object of the PKI-based authentication system, is a system that performs the entire management of the validity of the certificate in response to registration, issuance and inquiry of the certificate. In the case of a digital document transmission/reception requiring security over the Internet, the certificate authority 108 which is a third party of a public trust issues a digital certificate for authenticating a user registered as a member in the authentication system to more reliably provide digital document transmission services using the certificate. If there is a certificate validity modification request from the user system 104 in accordance with the embodiment of the present invention, the certificate authority 108 performs the certificate validity modification, in response to the modification request, through user authentication using the biometric information.

Figure 3:
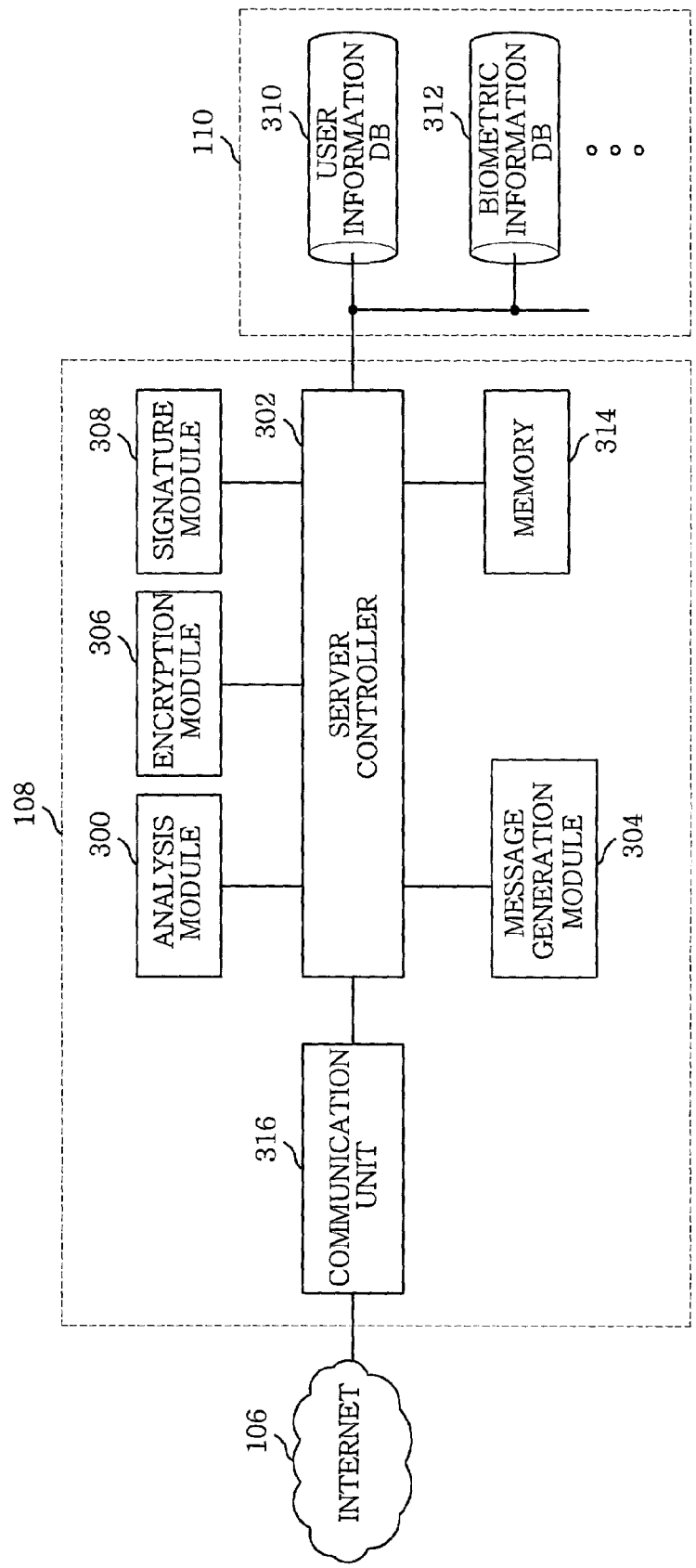
FIG. 3 is a schematic block diagram showing the construction of a certificate authority server in accordance with the present invention.

FIG. 3 is a schematic block diagram showing the construction of the certificate authority server 108 in FIG. 1. Referring now to FIG. 3, a more detailed description will be given of the operation of the server 108. The certificate authority server 108 includes an analysis module 300, a server controller 302, a message generation module 304, an encryption module 306, a signature module 308, a memory 314 and a communication unit 316. The certificate authority server 108 further has a connection to a database storage unit 110.

The analysis module 300 decrypts the certificate validity modification request message, encrypted and sent by the user system 104, under the control of the server controller 302 and checks integrity of the decrypted request message.

The message generation module 304 generates under the control of the server controller 302 an acknowledgment message for informing the user that the certificate validity modification has been normally performed in response to the modification request message or an error message for informing the user that certificate validity modification has been in error due to non-matching of the biometric information. The encryption module 306 encrypts the acknowledgment message or error message generated by the message generation module 304 with a public key of the user system 104. The signature module 308 executes a digital signature using a private key of the certificate authority 108 with respect to the response or error messages protect-processed with a shared secret key of the user system 104.

The server controller 302 controls the entire operation of the certificate authority server 108. Especially, when receiving the certificate validity modification request message from the member user of the authentication system in accordance with the embodiment of the present invention, the server controller 302 checks the member user's biometric information from the user system 104 to perform an authentication with respect to the member user. If the member user who has requested the certificate validity modification is determined to be a valid one, then the server controller 302 controls the message generation module 304 to generate the acknowledgment message for informing the user that the certificate validity modification request from the user system 104 has been normally processed. Then, the server controller 302 controls the encryption module 306 and signature module 308 to protect-process the generated acknowledgment message with the secret shared key and perform the digital signature with respect to the protect-processed response using the private key of the certificate authority server 108. The server controller 302 sends online the resulting acknowledgment message to the user system 104.

The database storage unit 110 which is referred to by the certificate authority server 108 includes various databases required for operating the server 108, such as a user information database 310, biometric information database 312, etc. The user information database 310 stores user information of the member-registered user. The biometric information database 312 stores the biometric information of the member-registered user in such a way to be matched with the user information. The memory 314 stores a variety of operation programs required for the operation of the server controller 302. The memory 314 has a read only memory (ROM) for storing basic data needed for driving the operation programs and a random access memory (RAM) for temporarily storing programs run according to the control of the server controller 302 and data which are generated while the operation programs are performed. The communication module 316 sends the acknowledgment message corresponding to the certificate validity modification request to the user system 104 under the control of the controller 302. The communication module 316 interfaces data transmitted/received over the Internet 106 between the user system 104 and the certificate authority server 108.

Figure 4:
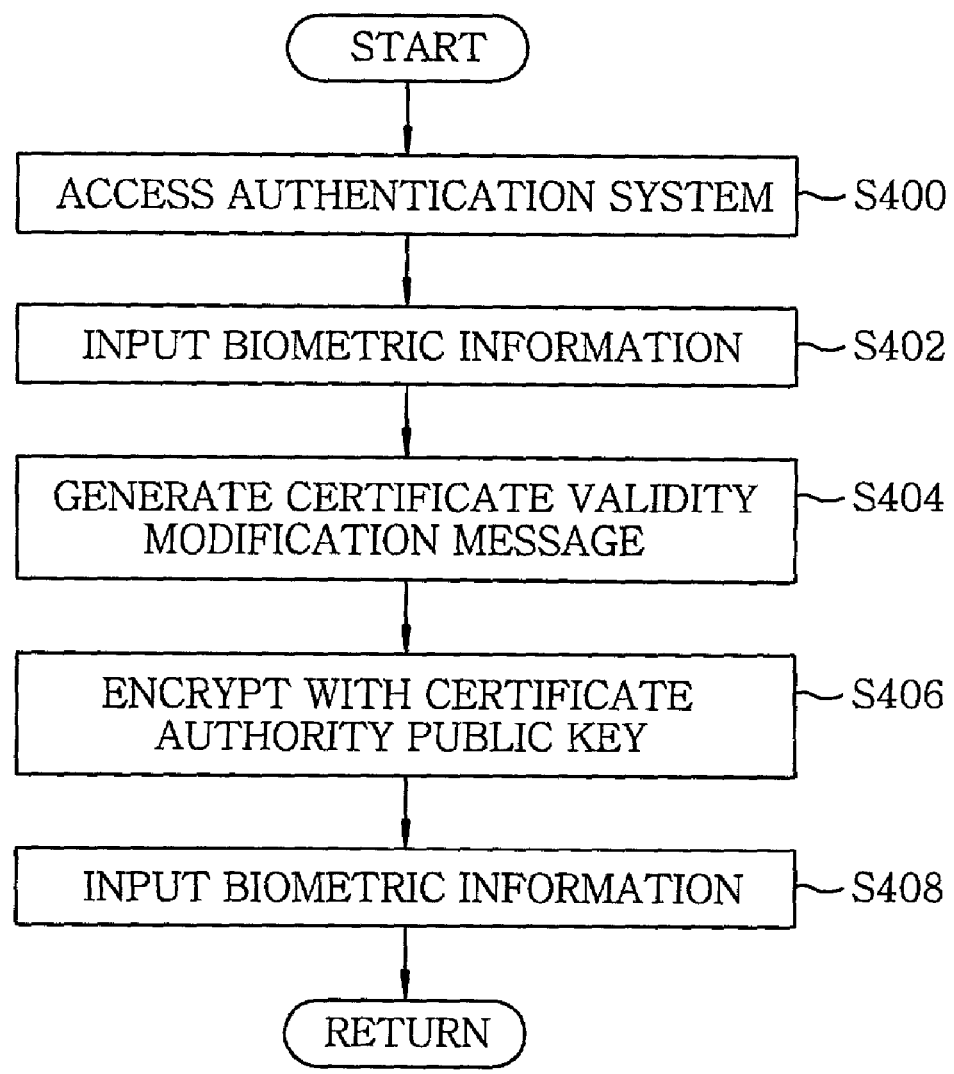
FIG. 4 is a flow chart illustrating a procedure of requesting a certificate validity modification in the user system of FIG. 2 in accordance with the present invention.

FIG. 4 is a flow chart illustrating a procedure where a member user, issued with a certificate from the certificate authority 108 according to the preferred embodiment of the present invention, requests a certificate validity modification using the user system 104. The certificate validity modification request procedure will be described in detail below with reference to FIGS. 1, 2 and 4.

After being registered as a member in the certificate authority server 108, a user can gain access to server 108 through his/her user system 104 and be issued with a certificate for his/her public key through user authentication using biometric information entered from him/her and a reference number assigned by the server 108 owing to the member registration. The certificate is a document that is issued by the certificate authority 108, which is a third party of public trust, and certifies identify of the member-registered user. The certificate authority 108 issues the certificate by executing digital signature with respect to public key information of the user. This certificate functions as an important element for executing security services. For example, the member user can authenticate a public key of the other party using the certificate.

As described above, it is possible to perform suspension, revocation and recovery of the certificate in response to the user's request. The user can gain access to the authentication system and send the request message to the certificate authority 108 to perform desired works such as the suspension, revocation and recovery of the certificate.

Namely, the user can gain access to the certificate system through the user system 104 connected to the Internet 106 using his/her login information. The user system 104 then downloads a Web page picture, from the certificate authority server 108, for security services that the server 108 provides to a member-authenticated user and displays the downloaded Web page picture on the monitor 200 of the user system 104 (S400). The Web page picture may preferably be configured with various menus associated with security services, certificate information modification and so forth such that the member-authenticated user can perform a variety of functions.

The user can select a desired menu among certificate validity modification menus on the Web page picture to request the certificate validity modification. For example, in the case of revocation of an unneeded certificate, the user can select a certificate revocation menu, in the case of suspension for a while, a certificate suspension menu, and in the case of recovery of suspended certificate, certificate recovery menu.

If the user selects a desired menu, then the user system 104 requests biometric information input and inputs the user's unique biometric information from the user through the fingerprint information input unit 102 which is one of the biometric information input units (S402). Subsequently, the user system 104 generates a certificate modification request message containing the inputted user biometric information, or the user fingerprint information (S404). Thereafter, the user system 104 encrypts the generated certificate modification request message with a public key (S406) and sends the encrypted certificate modification request message to the certificate authority 108 over the Internet 106 (S408).

Figure 5:
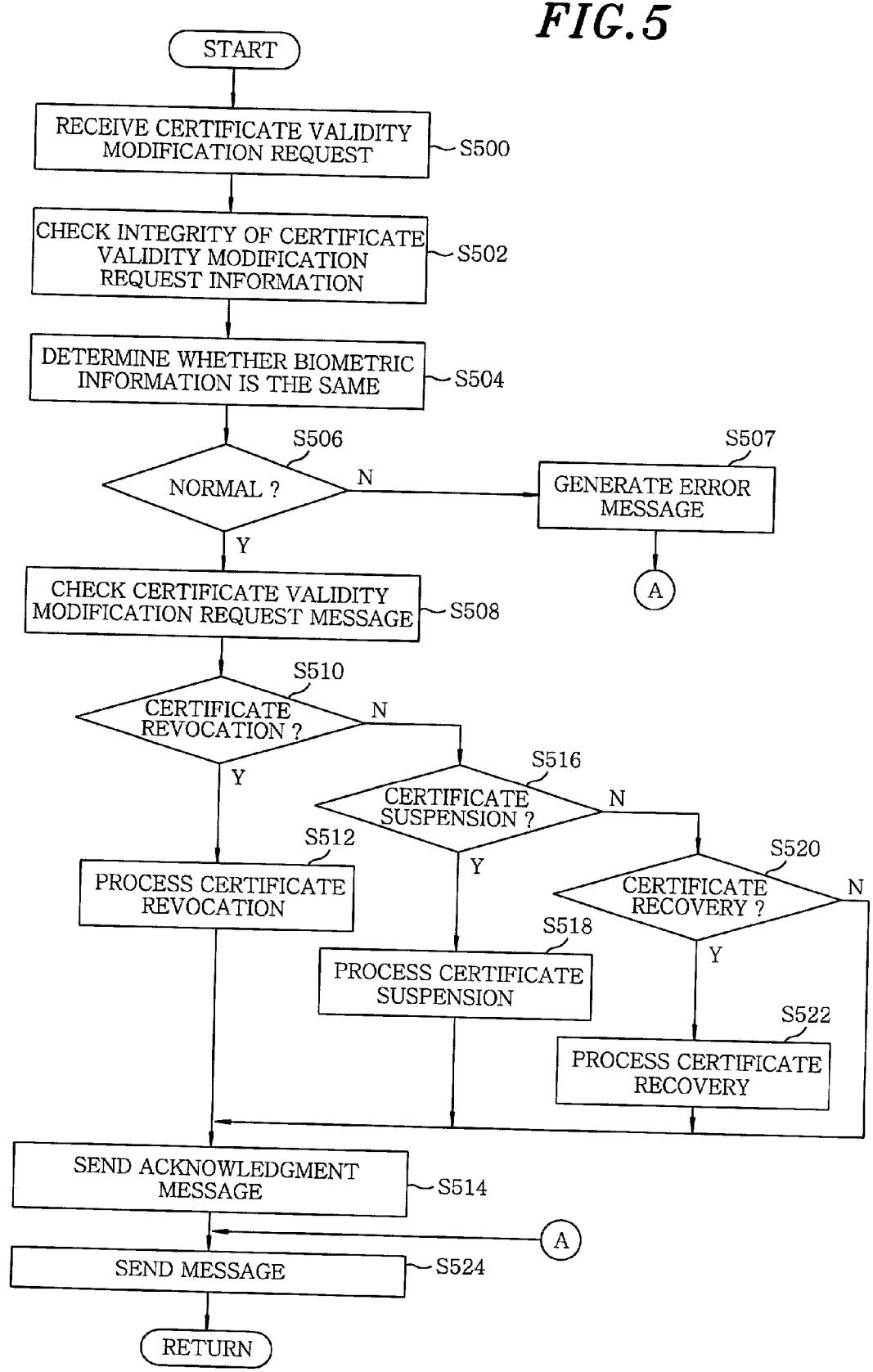
FIG. 5 is a flow chart illustrating a procedure of performing the certificate validity modification in the certificate authority server of FIG. 3 in accordance with the present invention.

FIG. 5 is a flow chart illustrating a procedure of performing the certificate validity modification in the certificate authority server 108 of the PKI-based authentication system using biometric information in accordance with the embodiment of the present invention. The certificate validity modification execution procedure will be described below in detail with reference to FIGS. 1, 3 and 5.

First, if the certificate authority server 108 receives an encrypted certificate validity modification request message from the user system 104 connected thereto through the Internet 106 (S500), the server controller 302 of the server 108 controls the analysis module 300 to decrypt the encrypted certificate validity modification request message and analyze a digital signature of the member user to check integrity of certificate validity modification information (S502). Subsequently, the server controller 302 determines whether the user biometric information contained in the certificate validity modification request message is the same as user biometric information stored in the biometric information database 312 in the database storage unit 110 (S504).

If it is determined at step 506 that the integrity of the certificate validity modification request message is compromised, or that the received user fingerprint information is not the same as preregistered user fingerprint information stored in the biometric information database 312, the server controller 302 controls the message generation module 304 to generate a certificate validity modification error message for notifying the user that the certificate validity modification cannot be normally performed, and sends the generated certificate validity modification error message to the user system 104 (S507).

Alternatively, if it is determined at step 506 that there is no compromise of the integrity of the certificate validity modification request message, and that the received user fingerprint information is the same as preregistered user fingerprint information stored in the biometric information database 312, the server controller 302 checks the certificate validity modification request message to determine whether it indicates revocation, suspension or recovery of the certificate (S508).

If it is determined at step 510 that the certificate validity modification request message indicates the certificate revocation, the server controller 302 normally performs a revocation process of certificate of the member user (S512) and controls the message generation module 304 to generate an acknowledgment message for notifying the user that the certificate revocation request has been normally processed (S514). Alternatively, if it is determined at step 516 that the certificate validity modification request message indicates the certificate suspension, the server controller 302 normally performs a suspension process of the certificate of the member user (S518) and controls the message generation module 304 at step 514 to generate an acknowledgment message for notifying that the certificate suspension request has been normally processed. On the other hand, if it is determined at step 520 that the certificate validity modification request message indicates the certificate recovery, the server controller 302 normally performs a recovery process of the certificate of the member user (S522) and controls the message generation module 304 at step 514 to generate an acknowledgment message for notifying the user that the certificate recovery request has been normally processed.

Thereafter, the server controller 302 encrypts the acknowledgment message generated in accordance with the process result of the certificate validity modification request using a public key of the user system 104, performs a digital signature with respect to the encrypted acknowledgment message using a private key of the certificate authority 108 and sends the resulting acknowledgment message to the user system 104 (S524).

As a result, it is possible to perform online the certificate validity modification between the user system and the certificate authority by executing more reliable authentication of a user using user biometric information in the PKI-based authentication system.

As apparent from the above description, the present invention provides a method for modifying validity of a certificate using biometric information in a PKI-based authentication system, which is capable of performing online suspension, recovery and revocation of a certificate between a user system and a certificate authority by executing user authentication with guaranteed reliability using user biometric information. Therefore, there is no need for the user to personally visit a registration authority or certificate authority to modify the certificate validity. The user can easily modify the certificate validity using his/her user system connected online to the certificate authority.

While the invention has been shown and described with respect to the preferred embodiments, it will be understood by those skilled in the art that various changes and modifications may be made without departing from the spirit and scope of the invention as defined in the following claims.

What is claimed is:

1. A method for modifying validity of a certificate using biometric information in a public key infrastructure-based authentication system including a registration authority for verifying identity of at least one user by proxy, a certificate authority for issuing the identity-verified user with the certificate and a user system, the method comprising the steps of:

a) accessing a server of the certificate authority using login information of the user in response to a certificate validity modification request from the user under the condition that he/she is registered as a member in the authentication system;

b) inputting the biometric information for a user authentication through a biometric information input unit in the user system;

c) generating a certificate validity modification request message in response to the certificate validity modification request from the user, wherein generating a certificate validity modification request message includes one of:

generating a certificate revocation request message revoking the certificate issued to the user;

generating a certificate suspension request message suspending the certificate issued to the user; and generating a certificate recovery request message recovering suspended authority of the certificate of the user; and d) sending the inputted biometric information and the generated certificate validity modification request message to the certificate authority to request the certificate validity modification online.

2. The method of claim 1, wherein the inputted biometric information and the generated certificate validity modification request message are encrypted with a public key of the certificate authority and sent thereto.

3. A method for modifying validity of a certificate using biometric information in a public key infrastructure-based authentication system including a registration authority for verifying identity of at least one user by proxy, a certificate authority for issuing the identity-verified user with the certificate and a user system, the method comprising the steps of:

a) receiving a message for requesting a certificate validity modification from the user system under the condition that the user system is connected to the authentication system via the Internet;

b) receiving login information and the biometric information entered from the user for a system member authentication if he/she requests the certificate validity modification;

c) determining whether the received biometric information is the same as user's biometric information registered in a database storage unit if the user is authenticated on the basis of the received login information;

d) modifying the validity of the certificate issued to the user in response to the certificate validity modification request if the received biometric information is the same as the user's registered biometric information; and e) sending to the user system an acknowledgment message for notifying the user that the certificate validity modification has been normally processed;

wherein step d) includes:

d1) revoking the certificate issued to the user if the certificate validity modification request message indicates certificate revocation;

d2) suspending the certificate issued to the user if the certificate validity modification request message indicates certificate suspension; and d3) recovering suspended authority of the certificate of the user if the certificate validity modification request message indicates certificate recovery.

4. The method of claim 3, further comprising the step of:

a1) after performing the step a), checking integrity of the received certificate validity modification request message and sending to the user system an error occurrence message for notifying the user that the certificate validity modification has been not processed if there is an integrity compromise in the received certificate validity modification message.

5. The method of claim 3, further comprising the step of:

c1) sending to the user system an error occurrence message for notifying the user of a failure of member user authentication if it is determined at the step c) that the received biometric information is not the same as the user's registered biometric information.

6. The method of claim 3, wherein the database storage unit includes:

a user information database for storing user information under the condition that the user is registered as a member in the authentication system; and a biometric information database for storing the biometric information of the user registered as a member, the user information and the biometric information being registered and stored in such a way as to be matched with each other.

7. The method of claim 1, wherein the user system includes a biometric information input unit for inputting the biometric information of the user.

8. The method of claim 1, wherein the biometric information is information about a user's unique fingerprint.

9. The method of claim 1, wherein the biometric information is information about a user's unique iris.

10. The method of claim 1, wherein the biometric information is information about a user's unique face feature vector.

11. The method of claim 3, wherein the user system includes a biometric information input unit for inputting the biometric information of the user.

12. The method of claim 3, wherein the biometric information is information about a user's unique fingerprint.

13. The method of claim 3, wherein the biometric information is information about a user's unique iris.

14. The method of claim 3, wherein the biometric information is information about a user's unique face feature vector.

* * * * *